(12) United States Patent
Raciborski et al.

(10) Patent No.: US 7,706,280 B2
(45) Date of Patent: Apr. 27, 2010

(54) HEAVY LOAD PACKET-SWITCHED ROUTING

(75) Inventors: Nathan F. Raciborski, Phoenix, AZ (US); Michael M. Gordon, Paradise Valley, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 829 days.

(21) Appl. No.: 11/195,247

(22) Filed: Aug. 1, 2005

(65) Prior Publication Data

US 2007/0025327 A1    Feb. 1, 2007

(51) Int. Cl.
H04L 12/28    (2006.01)

(52) U.S. Cl. .................. 370/237; 370/230; 370/230.1; 370/232; 370/233; 370/234; 370/238; 370/238.1; 370/392; 370/395.21; 370/411

(58) Field of Classification Search .................. 370/351, 370/230, 230.1, 232, 233, 234, 237, 238, 370/238.1, 392, 395.21, 411
See application file for complete search history.

(56) References Cited

U.S. PATENT DOCUMENTS

| | | | | |
|---|---|---|---|---|
| 6,108,703 | A * | 8/2000 | Leighton et al. | 709/226 |
| 6,775,235 | B2 | 8/2004 | Datta et al. | |
| 6,775,280 | B1 | 8/2004 | Ma et al. | |
| 6,785,704 | B1 * | 8/2004 | McCanne | 718/105 |
| 7,222,190 | B2 * | 5/2007 | Klinker et al. | 709/238 |
| 7,269,157 | B2 * | 9/2007 | Klinker et al. | 370/351 |
| 7,274,658 | B2 * | 9/2007 | Bornstein et al. | 370/227 |
| 7,349,994 | B2 * | 3/2008 | Balonado et al. | 709/250 |
| 2002/0143798 | A1 * | 10/2002 | Lisiecki et al. | 707/200 |
| 2002/0163882 | A1 * | 11/2002 | Bornstein et al. | 370/227 |
| 2003/0086422 | A1 | 5/2003 | Klinker et al. | |
| 2003/0135644 | A1 * | 7/2003 | Barrett | 709/238 |
| 2004/0114569 | A1 | 6/2004 | Naden et al. | |
| 2005/0010653 | A1 | 1/2005 | McCanne | |
| 2005/0071469 | A1 * | 3/2005 | McCollom et al. | 709/225 |
| 2005/0147081 | A1 | 7/2005 | Acharya et al. | |
| 2006/0182034 | A1 * | 8/2006 | Klinker et al. | 370/238 |

OTHER PUBLICATIONS

U.S. Appl. No. 11/461,173, Office Action dated Jan. 9, 2009, 22 pages.
U.S. Appl. No. 11/461,173, Final Office Action dated Sep. 2, 2009, 20 pages.

* cited by examiner

Primary Examiner—Dang T Ton
Assistant Examiner—Robert M Morlan
(74) Attorney, Agent, or Firm—Townsend and Townsend and Crew, LLP

(57) ABSTRACT

According to the invention, a content delivery network (CDN) for delivering content objects over the Internet is disclosed. The CDN includes a point of presence (POP), a content object request interface, and a routing function. At least one POP is coupled to a plurality of full-route networks. The content object request interface receives requests for content objects for delivery to a number of end users using a plurality of terminal networks. The routing function that routes content objects in at least two modes, where a first mode routes content objects based upon a first route path chosen based upon delivery efficiency, and a second mode routes at least some content objects using a second route path when at least of a portion of the first route path reaches a level of use. The first and second route paths egress to different full-route networks.

24 Claims, 10 Drawing Sheets

HEAVY LOAD PACKET-SWITCHED ROUTING

CROSS-REFERENCE TO RELATED APPLICATIONS

This application expressly incorporates by reference all of U.S. application Ser. No. 11/461,173, filed on Jul. 31, 2006, entitled "Routing Under Heavy Loading"

This disclosure relates in general to content delivery and, more specifically, but not by way of limitation, to dynamic bandwidth allocation for content delivery.

A content delivery network (CDN) is used by many web sites to deliver content more efficiently. The CDN may host, mirror or cache the content as well as deliver it to a requesting party. A web site or origin server is linked to the CDN such that some or all content can be sourced from the CDN rather than the web site. This process of fulfilling a link through a CDN is usually transparent to the user.

Singlecasting of large events can be difficult for CDNs to deliver effectively. CDNs deliver content objects such as files or streams to tens of thousands of recipients in a short period of time. Egress from the CDN can be overwhelmed by these large events. These egress points have finite bandwidth that serve as a bottleneck for large events. To avoid these bottlenecks, CDNs overbuild their egress points in anticipation of the loading.

BRIEF DESCRIPTION OF THE DRAWINGS

The present disclosure is described in conjunction with the appended figures.

Figure 1A:
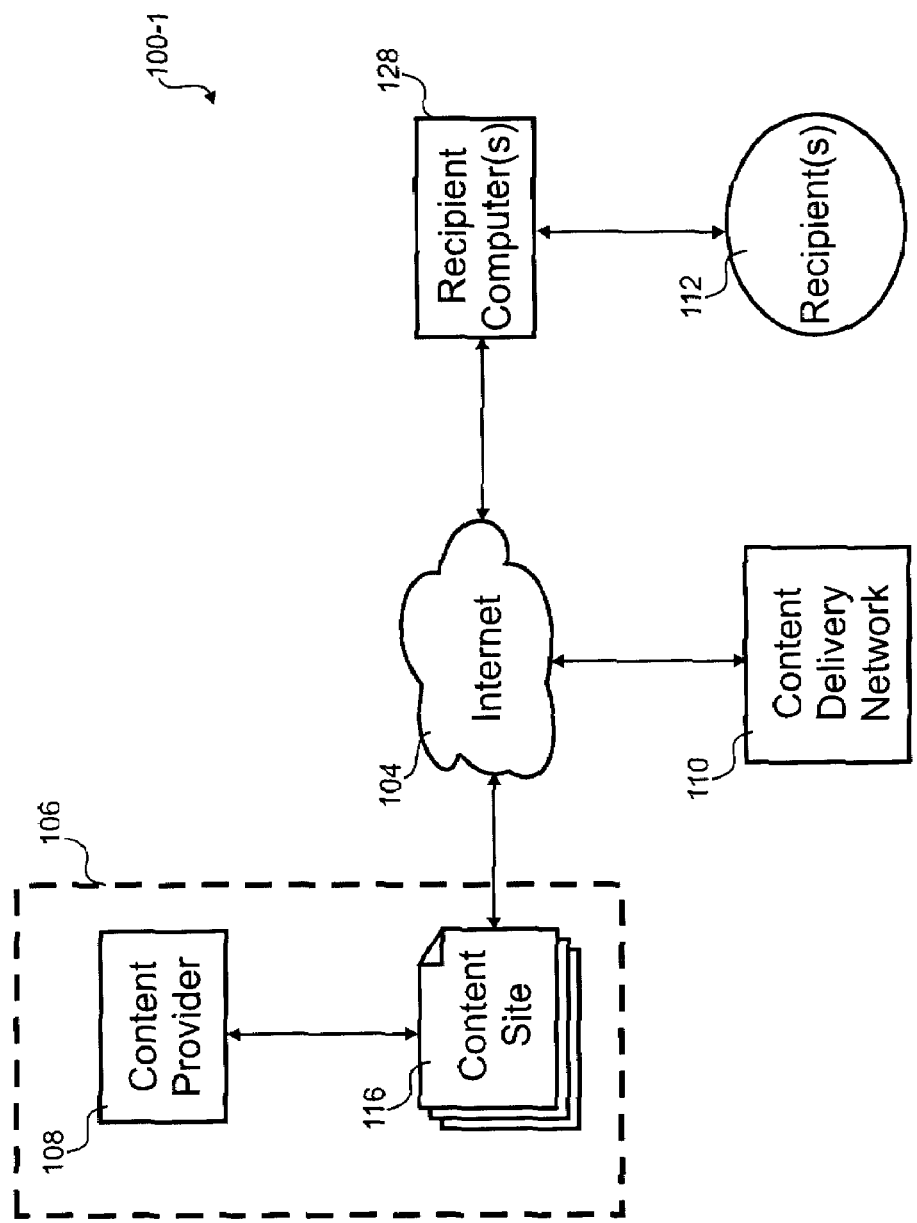
FIGS. 1A-1C are block diagrams of embodiments of a content system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

With reference to FIG. 1A, an embodiment of a content system 100 is shown where a content originator 106 offloads the delivery of the content objects to a content delivery network (CDN) 110. The content originator 106 produces a content object and includes a content provider 108 and a content or web site 116. A content object is any content file or content stream and could include, for example, software, audio, video, pictures and/or text. The content object could be live or stored. Throughout the specification, reference may be made to a content object, content stream and/or content file, but it is to be understood that those terms could be used interchangeably where they may appear.

Many content providers 108 use a CDN 110 to deliver the content objects to customers or recipients 112. Once a content object is selected by the recipient 112, the CDN 110 is passed the delivery address and information to retrieve the content object. The CDN 110 then sources the content object to the recipient 112. The content provider 108 typically pays the CDN 110 for the delivery of the content object.

The content originator 106 is the source or re-distributor of content objects. The content site 116 is a web site viewable with a web browser of the recipient. In other embodiments, the content site 116 could be accessible with application software other than a web browser. Links on the content site 116 are customized to allow delivery through one or more CDNs 110. The links may be rewritten before a web page is rendered or after a link is activated.

The recipient computer 128 receives the content object and processes it at the request of the recipient 112. Typically, a web browser on the recipient computer 128 is used to download the file or stream from the content originator 106 by using the CDN 110. A universal resource identifier (URI) in the web browser is found on the content site. The URI is rewritten before downloading a web page or through a redirection process to allow the CDN 110 to deliver a content object that came from the content originator 106.

Figure 1B:
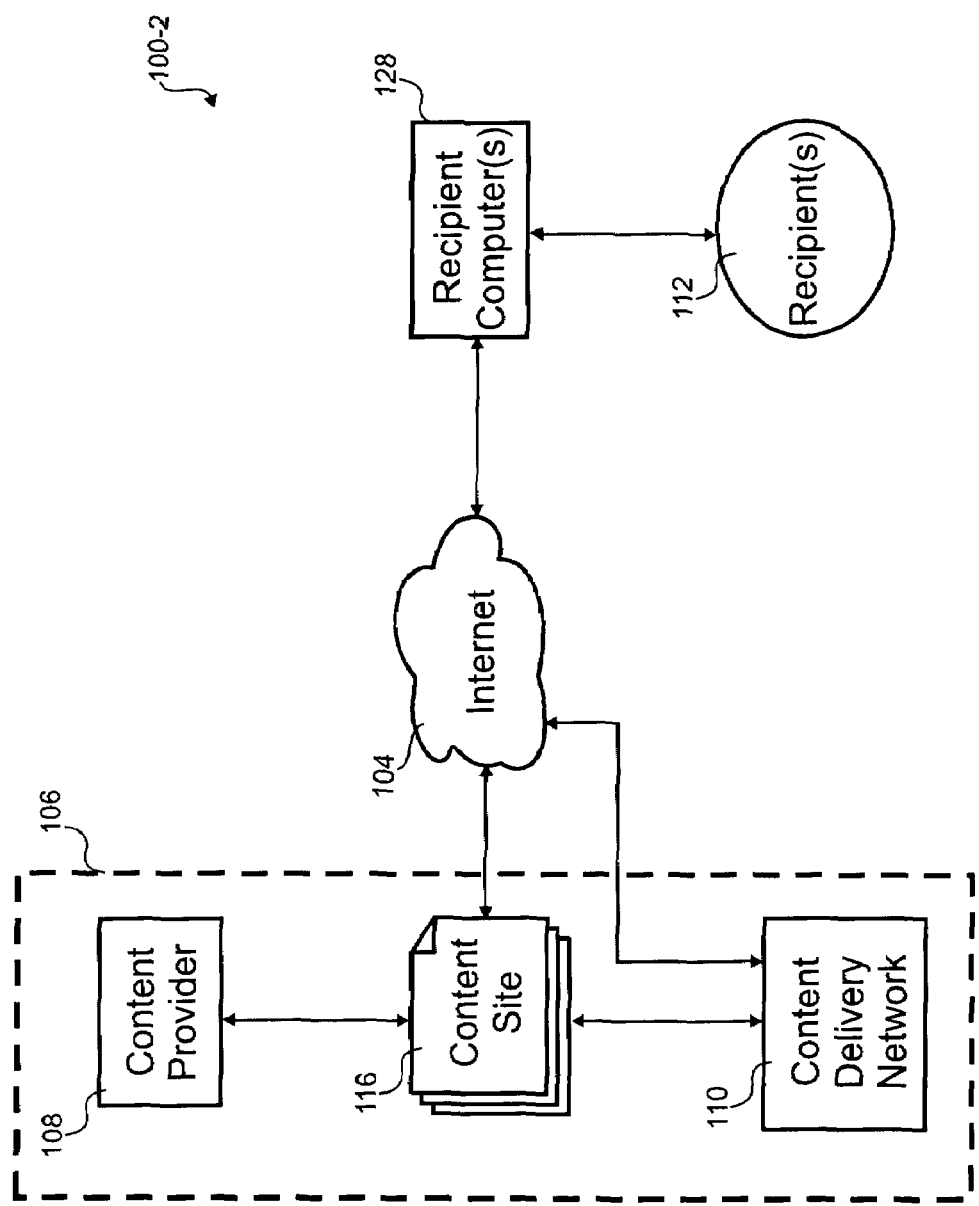

With reference to FIG. 1B, another embodiment of the content system 100-2 is shown where a content originator 106 offloads the delivery of the content objects or streams to a captive CDN 110-1. In the embodiment of FIG. 1A, the CDN 110 is a third party with respect to the content originator 106. In this embodiments, the captive CDN 110 is associated with the content originator and selectively used to delivery content objects or streams. For a captive CDN 110, the functions of the CDN 110 could be combined with and/or divided from other functions of the content originator 106.

Figure 1C:
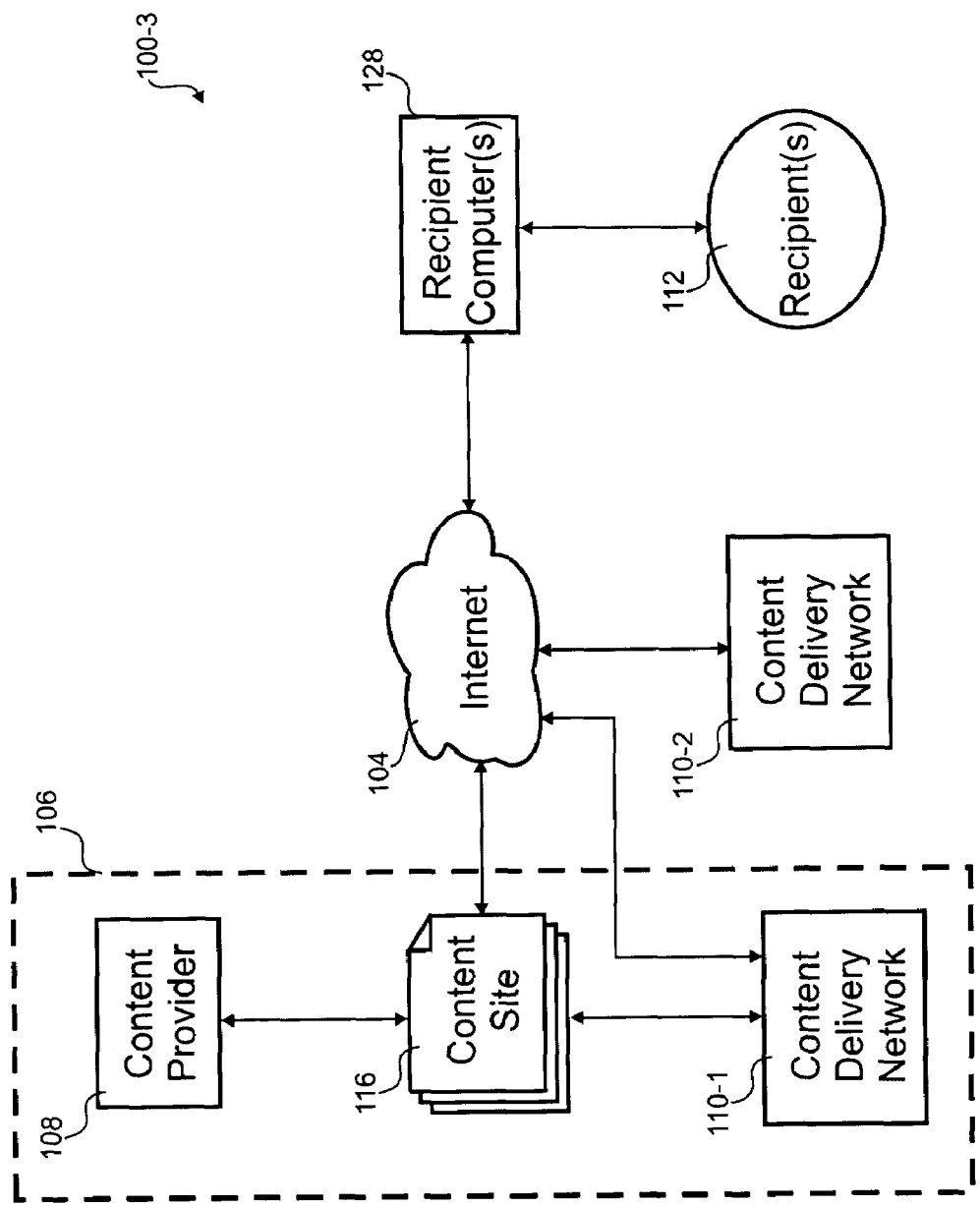

Referring next to FIG. 1C, yet another embodiment of the content system 100-3 is shown where a content originator 106 can choose to offload the delivery of the content objects or streams to either a captive CDN 110-1 or an external CDN 110-2. Routing algorithms used to choose between the two CDNs 110 could be based upon efficiency and/or cost until one of the two reaches a certain level of utilization, where after the routing algorithm switches to one not based on efficiency. For example, the requests could be assigned to one CDN 110 or the other in a random, round-robin, sequential or any other fashion.

Figure 2:
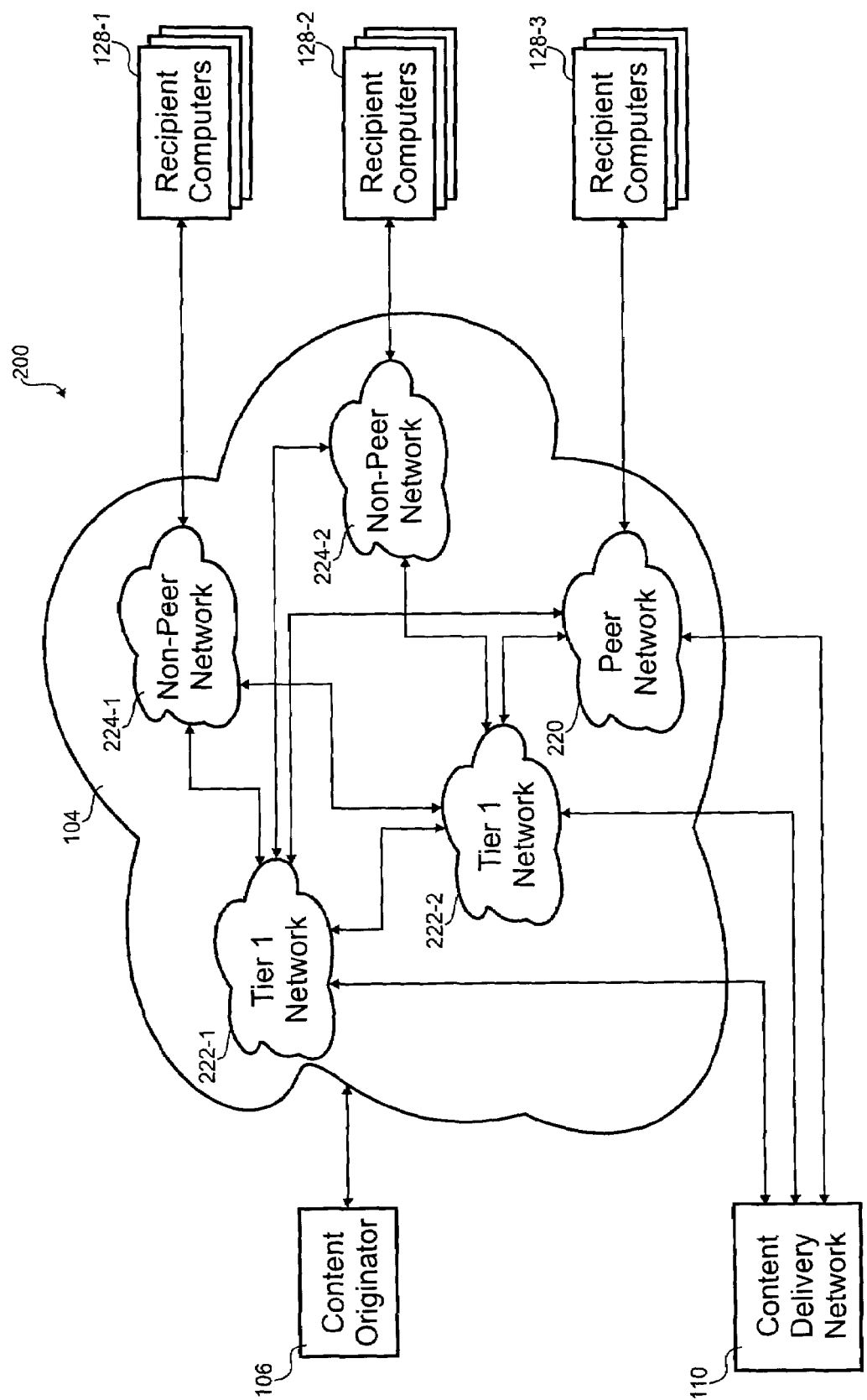
FIG. 2 is a block diagram of an embodiment of the content system that exposes routing details of the Internet.

With reference to FIG. 2, a block diagram of an embodiment of the content system 200 is shown that exposes routing details of the Internet 104. This embodiment shows the complex relationships between various networks 222, 224 that make up the Internet. In this embodiment, the CDN 110 has three egress points, namely, a first egress point goes to a first tier 1 network 222-1, a second egress point goes to a second tier 1 network 222-2 and a third egress point goes to a peer terminal network 220. Many other configurations are possible and this embodiment is simplified in some respects.

The Internet 104 is largely a group of networks 222, 224 that agree to carry each-others network traffic for free or some fee. These networks include tier 1 or full-route networks 222, peer terminal networks 220 and non-peer terminal networks 224. Tier 1 networks 222 are networks that can generally route to any address on the Internet, but they typically charge to receive content objects from CDNs 110. Tier 1 networks 222 are full-route networks in that any terminal network 220, 224 is reachable from any tier 1 network 222. Recipient computers get their Internet access through a terminal network 220, 224. The last network involved in the delivery to the recipient computer 128 is the terminal network 220, 224.

Peer terminal networks 220 accept network traffic from the CDN 110 with little or no additional cost, whereas non-peer terminal networks 224 charge a fee for network traffic that leaves the CDN 110. Terminal networks include both peer and non-peer networks 220, 224 and are distinguishable from tier 1 networks 222 in that terminal networks generally only accept content objects for a subset of valid IP addresses on the Internet 104. Typically, this subset of valid IP addresses are recipient computers 128 associated with that terminal network 220, 224. For example, a first group of recipient computers 128-1 is associated with a first non-peer terminal network 224-1 and a second group of recipient computers 128-2 is associated with a second non-peer terminal network 224-2.

Each CDN 110 has different arrangements with the various networks 222, 224 that make up the Internet 104. Because of these differing arrangements, the delivering costs to each CDN 110 could vary for a particular recipient. In this embodiment, the CDN 110 has a relationship with two tier 1 networks 222. Each tier 1 network 222 can rout to the two non-peer networks 224, but the efficiency would vary for each tier 1 network 222. All tier 1 networks generally have peering relationships with each other, but a first tier 1 network 222-1 cannot pass traffic to another tier 1 network 222-2 where the first tier 1 network 222-1 has egress to the terminal network associated with the target recipient computer for the traffic.

To pass content objects to the first and second group of recipient computers 128-1, 128-2, the CDN 110 would rely upon one of the tier 1 networks 222 to send the content object to the non-peer networks 224, who would finally pass it to the recipient computer 128-1, 128-2. The CDN can choose which tier 1 network 222 to use for a particular delivery. The content site might be given the option of either tier 1 network 222 for use when the content object is delivered. Various tier 1 networks 222 might be distinguished by a CDN 110 or content provider 108 based upon price, QoS and/or other factors.

Figure 3:
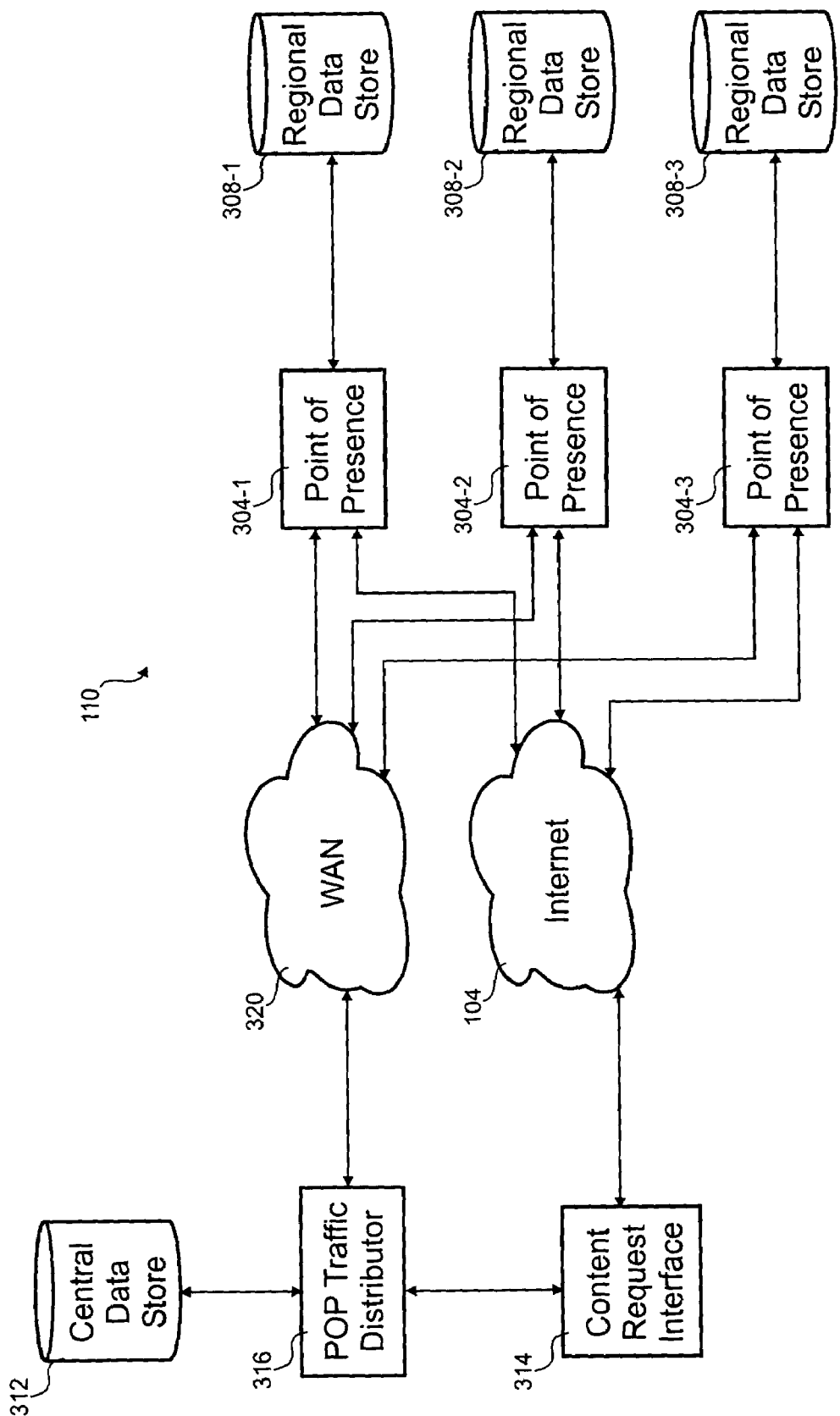
FIG. 3 is a block diagram of an embodiment of content delivery network (CDN)

With reference to FIG. 3, a block diagram of an embodiment of CDN 110 is shown. This embodiment has a central POP traffic distributor 316 and central data store 312 coupled by a WAN 320 or other backbone to a number of remote POPs 304. Various embodiments could have any number of POPs 304 geographically distributed to deliver content. Each POP 304 has egress to tier 1 networks 222 and peer networks 220 to deliver to recipient computers 128.

Routing decisions are made in a POP traffic distributor 316 and/or in the point of presence 304. In one embodiment, the POP traffic distributor 316 chooses the POP 304 and the POP 304 chooses the egress point. In another embodiment, the POP traffic distributor 316 makes all the routing decisions within the CDN 110.

The POP traffic distributor 316 receives requests for content objects through a content request interface 314 and distributes those requests to a POP 304 best suited to service the request. The central data store 312 may originally hold the content object, but it is cached or mirrored at a regional data store 308. Communication between the POP traffic distributor 316 and the POPs takes place over a WAN backbone 320 (e.g., leased line, a private network and/or the Internet 104).

In this embodiment, there are three POPs 304 that serve requests for content objects from their respective regional data store 308. The POPs 304 each have egress to various tier 1 networks 222 and peer networks 220 to serve various recipient computers 128. Different POPs 304 could have egress to different networks. The POP traffic distributor 316 is aware of the egress options for each POP 304 along with the terminal network 220, 224 associated with a particular recipient computer 128. So long as a particular POP 304 is not saturated, the POP traffic distributor 316 will include that POP 304 as a possible choice for delivering a particular content object. Once the content object request is associated with a particular POP 304, it will be served from that POP 304. That is a particular content object is not divided among multiple POPs 304 in this embodiment.

Figure 4A:
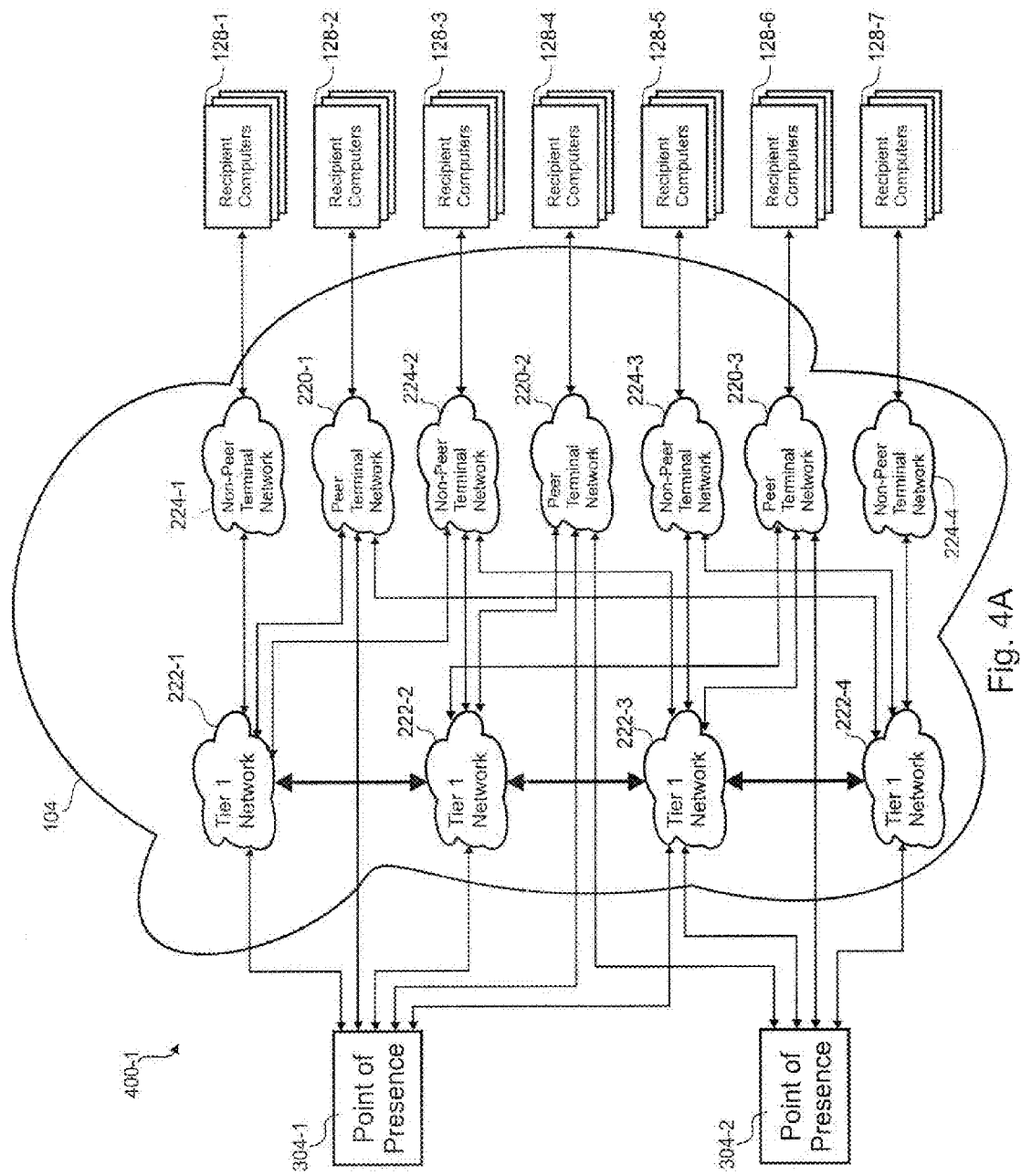
FIGS. 4A-4B are block diagrams of embodiments of the portion of the content system that shows the one or more points of presence (POP) for a CDN.

Referring next to FIG. 4A, a block diagram of an embodiment of portions of the content system 100-1 is shown that illustrates two POPs 304 for the CDN 110. Many embodiment would have additional POPs 304, but the simplified embodiment shown in this figure illustrates operation. The pop traffic distributor 316 assigns delivery of particular content objects between the two POPs 304. Each POP 304 has different egress points. Each egress point would have some type of interface circuit to couple the CDN 110 to the network 222, 220. This embodiment has four tier 1 networks 222, four non-peer terminal networks 224 and three peer terminal networks 220. A backbone could connect the POPs 304 with each other and connect the POPs 304 with other portions of the CDN 110.

The first POP 304-1 has five egress options to reach the seven groups of recipient computers 128. The first through third tier 1 networks 222-1, 222-2, 222-3 and the first and second peer networks 220-1, 220-2 can be reached directly by the first POP 304-1. To deliver a content object with the third peer network 220-3 or any of the non-peer networks 224, the first POP 304-1 would use the first through third tier 1 networks 222-1, 222-2, 222-3 to indirectly reach these destinations. In one routing example to the first peer network 220-1, the first POP 304-1 could send traffic directly to the first peer network 220-1 or through any of the first through third tier 1 networks 222-1, 222-2, 222-3. Normally, the first peer network 220-1 would be favored because of cost, but once the egress point to the first peer network 220-1 saturates a switch to one of the tier 1 networks 222-1, 222-2, 222-3 would be made.

The second POP 304-2 has four egress points that include the second and third peer networks 220-2, 220-3 and the third and fourth tier 1 networks 222-3, 222-4. The second POP 304-2 cannot directly route to any of the non-peer networks 224 or the first peer network 220-1. To reach these destinations indirectly, the traffic would be routed by the second POP 304-2 through the third or fourth tier 1 networks 222-3, 222-4. In one routing example to the first group of recipient computers 128-1, the second POP 304-2 would take an indirect route through the third or fourth tier 1 networks 222-3, 222-4.

The POPs 304 can route based upon efficiency, but could switch to a mode that distributes content objects to tier 1 networks 222 that are not the most efficient. Since each tier 1 network 222 is full-route, any terminal network 220, 224 can be reached even if not the most efficient route. In this way, saturated peer networks 220 or tier 1 networks 222 can be avoided by using a less optimal route. Different embodiments could use different algorithms when saturation occurs. For example, the remaining routing options could be weighted by cost or current utilization. Some embodiments could randomly or sequentially assign the future requests to other egress points. When the saturated egress point becomes less saturated, routing content objects with that egress point could continue according to efficiency.

Figure 4B:
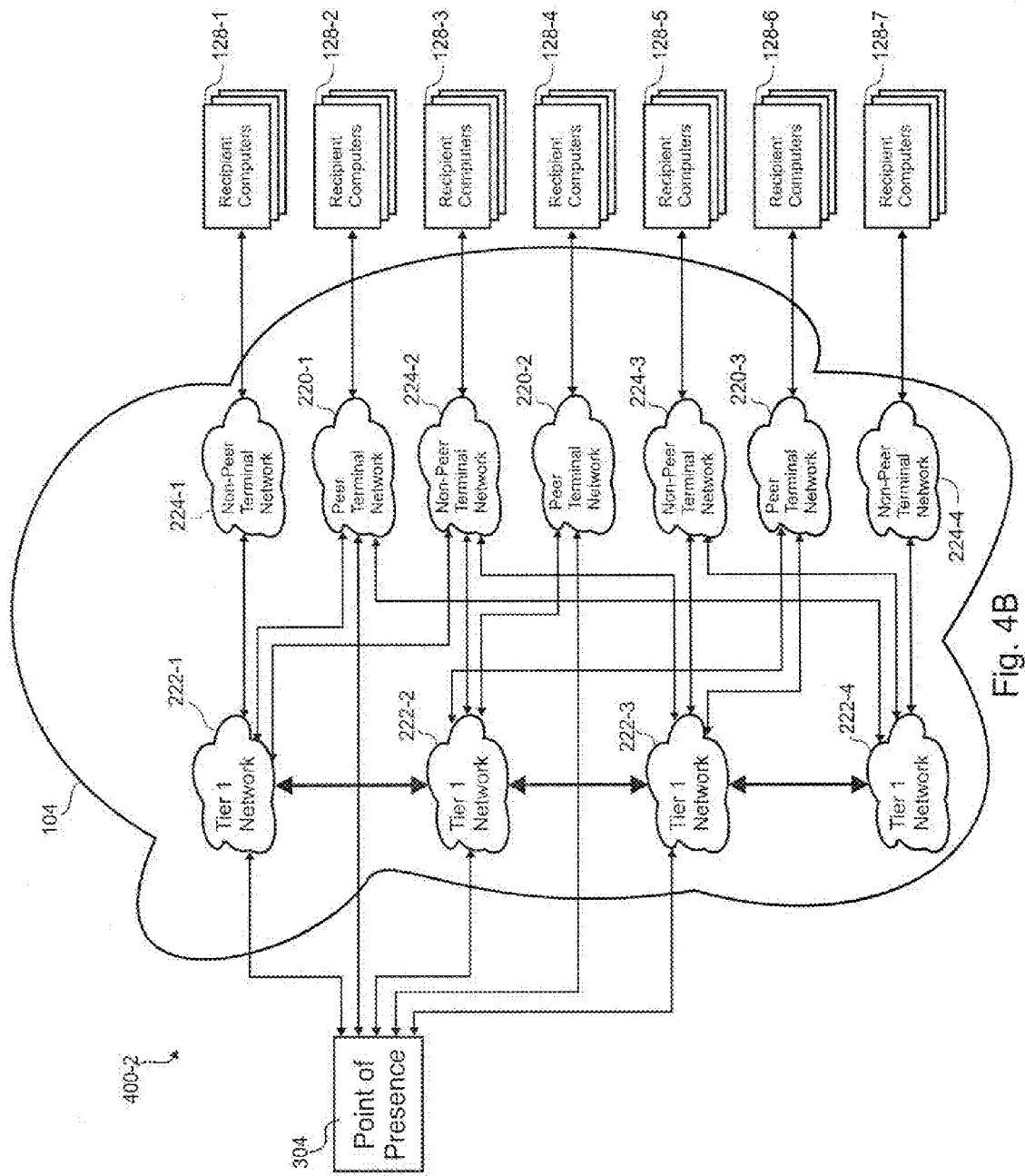

Referring next to FIG. 4B, a block diagram of another embodiment of portions of the content system 100-2 is shown that illustrates a single POP 304 for the CDN 110. In this embodiment, there in no backbone between multiple POPs 304. All content object or stream requests are either sourced directly from the content originator 106 or the single POP 304. The single POP 304 could be from a captive or external CDN 110-1, 110-2.

Figure 5A:
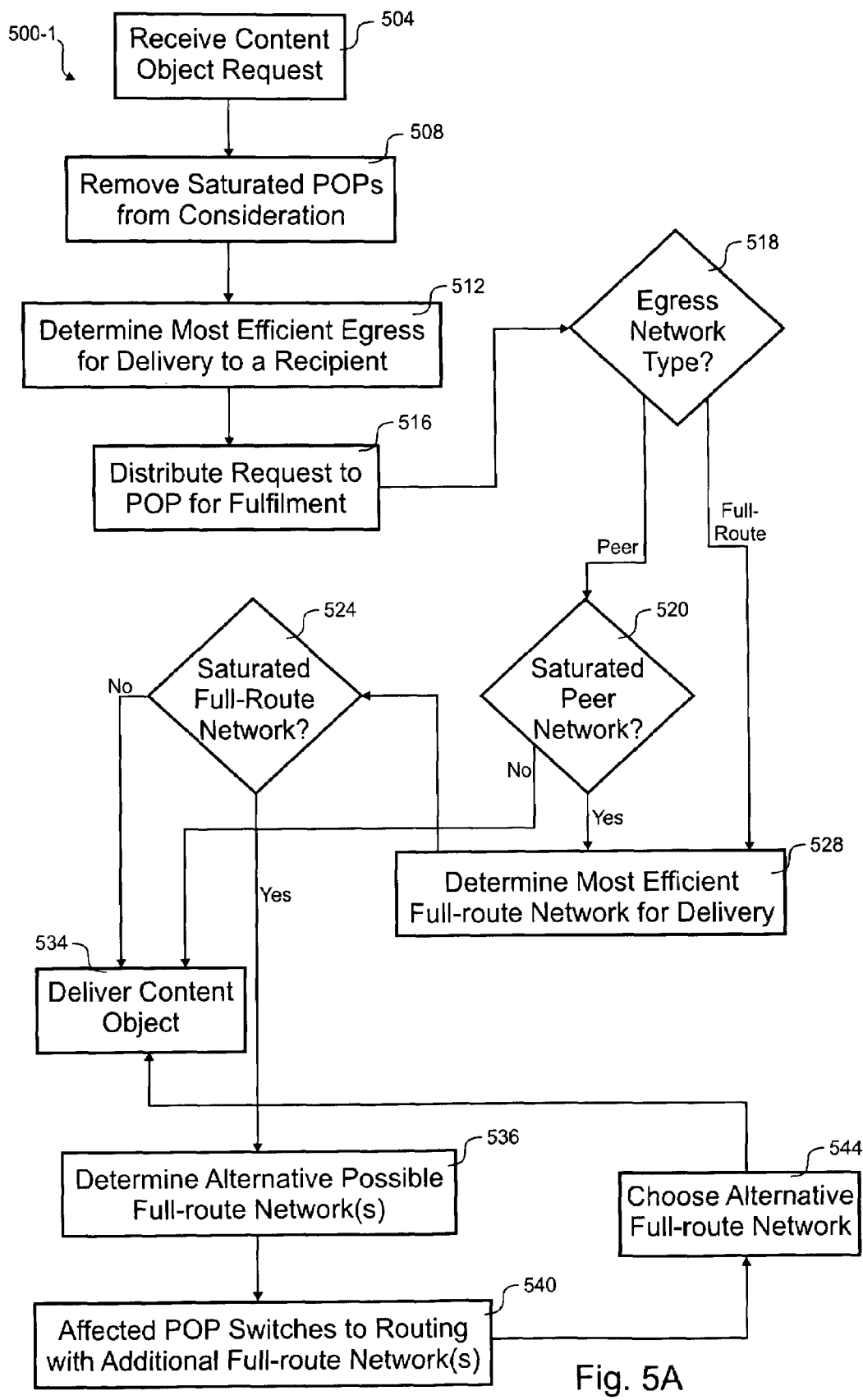
FIGS. 5A-C are flow diagrams of embodiment of a process for delivering content that switches between routing methods.

With reference to FIG. 5A, a flow diagram of an embodiment of a process 500-1 for delivering content is shown that switches between routing methods. The depicted portion of the process begins in step 504 where a content object request is received by the POP traffic distributor 316. This could be in the form of a URI that indicates the content object desired. The CDN can determine an IP address of the requesting computer 128 from the protocol level handshake to pass the URI. The IP address corresponds to a terminal network 220, 224 and a general geographic region. From this information, peering relationships, POP geographical locations and egress points, are analyzed to determine the possible POPs 304 to use.

In step 508, any saturated POPs 304 can be removed from consideration. A saturated POP may be completely saturated at all egress points or partially saturated at the relevant peering network. For example, routing to the fourth group of recipient computers 128-4 in FIG. 4 could resulting in possible routes given in Table I below. In this example, the recipient computer 128-4 is estimated to be geographically located in Las Vegas, Nev. and uses the second peer terminal network 220-2 for Internet access. Since the egress point from the first POP 304-1 to the peer network 220-2 is 90% saturated along with the tier 1 networks 222, the first POP 304-1 would be removed from consideration although geographically closer to the recipient computer 128-4.

TABLE I

Routing Possibilities to Fourth Group of Recipient Computers

| POP(s) | Route | Saturation |
|---|---|---|
| 304-1 in Tucson, AZ | 220-2, 128-4 | 90% |
| | 222-2, 220-2, 128-4 | 85% |
| | 222-1, 222-2, 220-2, 128-4 | 80% |
| | 222-3, 222-2, 220-2, 128-4 | 70% |
| 304-2 in New York, NY | 220-2, 128-4 | 10% |
| | 222-3, 222-2, 220-2, 128-4 | 90% |
| | 222-4, 222-2, 220-2, 128-4 | 40% |

In step 512, the most efficient egress point is determined. In this example, the second POP 304-2 is the only remaining POP 304 under consideration, but in other embodiments many more POPs could be available such that egress from multiple POPs is considered. Considering the three routing possibilities for the second POP, the route direct to the terminal peer network 220-2 would be the least costly since there is a peering relationship with the CDN 110. The request for the content object is passed to the second POP 304-2 in step 516. The decision in step 518 passes the request to step 520 because there is a peering relationship with the terminal network 220.

In step 520 a determination is made regarding the saturation level of the second peer network 220-2. Since the second peer network 220-2 is only 10% saturated in this example, processing would continue to step 534 where the content object would be delivered by the second POP 304-2 using the second peer network 220-2 in most cases. In this embodiment, once delivery starts with a particular egress point, it continues on that egress point until the stream or file delivery is completed.

Another example of the routing and saturation levels for the embodiment of FIG. 4 is shown in Table II. In this embodiment, the egress from the first POP 304-1 to the second peer network 220-2 is saturated to a level of 91%. For step 520, a saturation threshold is set at some number, for example, 50%, 60%, 70%, 80%, 90%, 95%, or 100%. Initially, saturation is determined by figuring how much of the bandwidth of the egress point is consumed in one embodiment. If packet loss increases beyond some level, saturation would be found even if the egress point bandwidth is not completely consumed as packet loss is an indicator that there is another bandwidth bottle neck between the egress point and the destination computer 128.

TABLE II

Routing Possibilities to Fourth Group of Recipient Computers

| POP(s) | Route | Saturation |
|---|---|---|
| 304-1 in Tucson, AZ | 220-2, 128-4 | 91% |
| | 222-2, 220-2, 128-4 | 88% |
| | 222-1, 222-2, 220-2, 128-4 | 72% |
| | 222-3, 222-2, 220-2, 128-4 | 10% |
| 304-2 in New York, NY | 220-2, 128-4 | 95% |
| | 222-3, 222-2, 220-2, 128-4 | 91% |
| | 222-4, 222-2, 220-2, 128-4 | 86% |

Where the peer network connection is saturated as in the example of Table II, an alternative full-route tier 1 network 222 would be found. The most efficient tier 1 network 222 alternative is chosen in step 528. In this example, the second tier 1 network 222-2 is found to be the most efficient as it has the least hops. The affected POP 304-1 would switch to delivering all new traffic for the fourth group of recipient computers to the second tier 1 network 222-2 until the saturation level of the connection to the second peer network 220-2 decreases. Where a tier 1 network 222 is the first choice in step 518 processing would pass from that step 528 to determine the most efficient tier 1 network 222 to use.

The chosen tier 1 network 222-2 is checked for saturation in step 524. The saturation determination is a function of both theoretical bandwidth of the egress point and packet loss. Excessive use of the bandwidth or observed packet loss would result in a determination that the tier 1 network is saturated 222. In the example of Table III that is based upon the embodiment of FIG. 4, the second tier 1 network 222-2 is not saturated so processing would go from step 524 to step 534 where the content object would be delivered with the second tier 1 network 222-2.

TABLE III

Routing Possibilities to Fourth Group of Recipient Computers

| POP(s) | Route | Saturation |
|---|---|---|
| 304-1 in Tucson, AZ | 220-2, 128-4 | 90% |
| | 222-2, 220-2, 128-4 | 65% |
| | 222-1, 222-2, 220-2, 128-4 | 50% |
| | 222-3, 222-2, 220-2, 128-4 | 70% |
| 304-2 in New York, NY | 220-2, 128-4 | 95% |
| | 222-3, 222-2, 220-2, 128-4 | 90% |
| | 222-4, 222-2, 220-2, 128-4 | 90% |

Where the tier 1 network 222-2 is saturated as shown in the example of Table II, the content object would be delivered by some other tier 1 network 222. In step 536, a list of alternative tier 1 networks is determined. In this example, the egress from the first POP 304-1 to the first, second and third tier 1 networks 222-1, 222-2, 222-3 and the egress from the second POP 304-2 to the fourth tier 1 network 222-4 are all possible egress points where the qualifying saturation level is set to 86%. The traffic that would be routed to the saturated tier 1 network 222-2 is diverted to the one or more tier 1 networks 222 in step 540.

There are many different possible algorithms to route to another tier 1 network 222 in step 544. These algorithms generally distribute traffic across tier 1 networks 222 in one or more POPs 304 so long as those tier 1 networks are not also saturated. For example, a first overflow request could be served by a first POP 304 and the next overflow request could be served by a second POP 304.

Some embodiments only route overflow to tier 1 networks 222 associated with the POP 304 where the saturation occurred instead of considering other POPs 304. Using the example of Table II, traffic initially destined for the second peer network 220-2 or the second tier 1 network 222-2 would be distributed between the first and third tier 1 networks 222-1, 222-3, which are not currently saturated. Choosing between the alternative tier 1 networks 222 could be done in a number of ways.

Some algorithms could weight the attractiveness of a tier 1 network 222 according to saturation, cost and/or efficiency. None of these algorithms is based solely upon efficiency as the most efficient network 220, 222 is already saturated. A first algorithm takes all the unsaturated tier 1 networks 222 and determines the cheapest one or more. The future content object requests are distributed randomly or sequentially across all tier 1 networks 222 of the same cost. Where there are several cost levels one algorithm weights the attractiveness of a tier 1 network 222 according to the relative cost. Another algorithm distributes requests according to saturation level such that the least saturated are favored over the more saturated. Yet another algorithm takes all the tier 1 networks 222 that egress to the terminal network 220, 224 without routing through another tier 1 network 222 and distributes traffic among them. Once the alternative tier 1 network 222 is chosen in step 544, the request is fulfilled by that tier 1 network 222 in step 534.

Figure 5B:
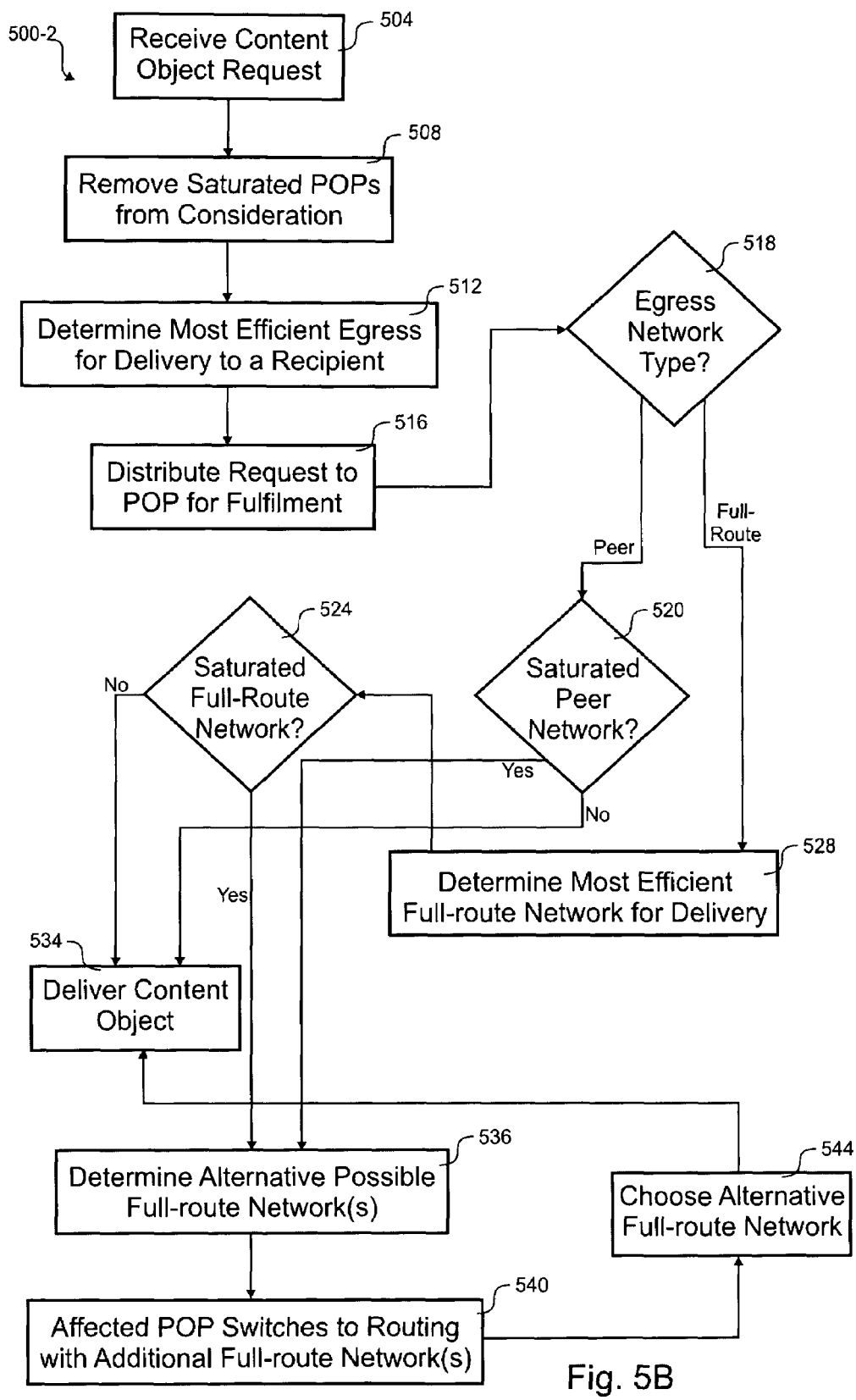

With reference to FIG. 5B, a flow diagram of another embodiment of a process 500-2 for delivering content is shown that switches between routing methods. This embodiment eliminates step 528 and does not find an efficient tier 1 network 222 after finding the peer network 220 is saturated. Processing goes from step 520 to step 536 when the peer network 220 is saturated. Accordingly, where the first chosen peer network 220 or tier 1 network 222 is saturated, the alternatives are analyzed to find an alternative. In one embodiment, this has the effect of distributing the traffic across many of the alternative paths.

Figure 5C:
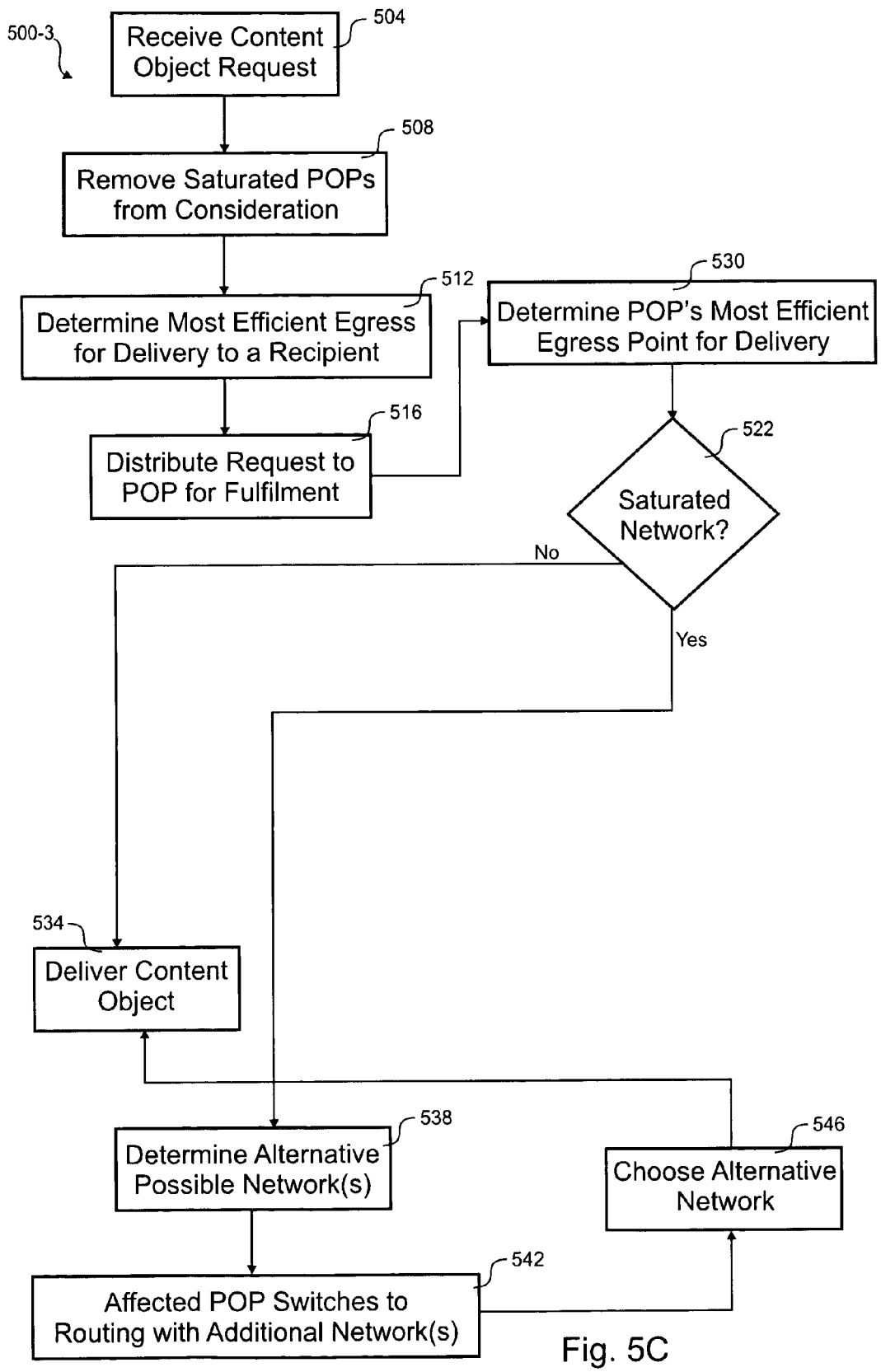

With reference to FIG. 5C, a flow diagram of yet another embodiment of a process 500-3 for delivering content is shown that switches between routing methods. This embodiment does not differ from the embodiment of FIG. 5A until after step 516. In step 530, the most efficient egress point is determined, which could be egress to a peer network 220 or a tier 1 network 222. If the first choice is not saturated in step 522, the content object is delivered in step 534.

When the initial network 220, 222 is saturated processing continues to step 538 where alternative tier 1 and peer networks 222, 220 are determined. The alternatives may be chosen from the present POP 304, all possible POPs 304 or all unsaturated POPs 304. In step 542, the affected POP switches to routing based upon factors other than efficiency. For example, the routing could be sequential or randomly disbursed among the alternatives, where the alternatives are weighted by cost, saturation level and/or efficiency. The alternative for a particular request is chosen in step 546 and delivered in step 534. In one embodiment, switching to the alternative routing would distribute excess to other networks 220, 222 that could deliver a piece of content.

Although the embodiments of FIGS. 5A-5C talk in terms of saturation, switching to the alternative routing method could be done far before saturation. For example, switching could be any threshold such as 40%, 50%, 60%, 70%, or 80% utilization. Use of the term saturation is not necessarily meant to imply that performance is degraded. Indeed, performance might not be affected until 95% or more saturation in some embodiments. Switching to alternative routing at 50% utilization would serve to avoid any premature risk of degraded performance due to saturation.

While the principles of the disclosure have been described above in connection with specific apparatuses and methods, it is to be clearly understood that this description is made only by way of example and not as limitation on the scope of the invention.

What is claimed is:

1. A content delivery network (CDN) for delivering content objects over the Internet, the CDN comprising:
    a point of presence (POP), wherein:
        the POP is coupled to a plurality of full-route networks,
        each of the plurality of full-route networks delivering content objects to a plurality of terminal networks,
        the plurality of terminal networks comprise a first terminal network, and
        the plurality of terminal networks are coupled to a plurality of end users;
    a content object request interface that receives requests for content objects for delivery to the plurality of end users using the plurality of terminal networks; and
    a routing function that routes content objects in at least two modes, wherein:
        a first mode routes content objects based upon a first route path from the POP to the first terminal network,
        the first route path is chosen based upon efficiency based upon an efficiency algorithm,
        a second mode routes at least some content objects using a second route path when at least a portion of the first route path reaches a level of use,
        the second mode and the first mode are both simultaneously used to route content objects after the portion of the first route path exceeds the level of use,
        the second route path is chosen without considering delivery efficiency as defined by the efficiency algorithm,
        use of the second route path in the second mode is less efficient than use the first route path in the second mode according to the efficiency algorithm, and
        the first and second route paths egress to different full-route networks.

2. The CDN for delivering content objects over the Internet as recited in claim 1, wherein egress from the POP for the second route path starts with a full-route network that is not directly coupled to the first terminal network, whereby another full-route network is used to reach the first terminal network.

3. The CDN for delivering content objects over the Internet as recited in claim 1, wherein the POP is one of a plurality of POPs, the CDN further comprising a backbone coupled to at least two of the plurality of POPs.

4. The CDN for delivering content objects over the Internet as recited in claim 1, wherein the second route path and the first route path pass through the same full-route network on the way to the first terminal network.

5. The CDN for delivering content objects over the Internet as recited in claim 1, wherein the CDN is a captive CDN integral to a content originator.

6. The CDN for delivering content objects over the Internet as recited in claim 1, wherein a full-route network does not pass traffic to another full-route network when the full-route network is directly coupled to the first terminal network.

7. The CDN for delivering content objects over the Internet as recited in claim 1, wherein the POP is one of a plurality of POPs, which are geographically distributed.

8. The CDN for delivering content objects over the Internet as recited in claim 1, wherein the POP stores at least one of the content objects.

9. A method for delivering content objects over the Internet with a distribution system, the method comprising steps of:
    receiving a first request to deliver a first content object to a first end user, wherein:
        the distribution system comprises a point of presence (POP),
        the POP is coupled to a plurality of full-route networks,
        the plurality of full-route networks comprise a first full-route network and a second full-route network,
        each of the plurality of full-route networks delivering content objects to a plurality of terminal networks,
        the plurality of terminal networks comprise a first terminal network,
        the first terminal network is coupled to a plurality of end users,
        the plurality of end users comprise the first end user and a second end user,
        the first end user and the second end user subscribe to the terminal network for Internet service,
        the POP is coupled to the first terminal network, and
        the first full-route network and the second full-route network are coupled to the first terminal network;
    determining that the first end user is associated with the first terminal network;
    determining that a first egress point between the POP and the first full-route network is more efficient a route than using the second full-route network;
    delivering the first content object with the first egress point;
    receiving a second request to deliver a second content object to the second end user,
    determining that the first egress point reaches a level of utilization;
    determining that the second end user is associated with the first terminal network; and
    delivering the second content object with a second egress point between the POP and the second full-route network, wherein:
        delivery with the second egress point is triggered by reaching the level of utilization,
        delivering the second content object begins while still delivering the first content object, and
        the second egress point is chosen without considering routing efficiency of starting delivery with the second egress point.

10. The method for delivering content objects over the Internet with the distribution system as recited in claim 9, wherein the delivering the second content object step comprises a step of sending the second content object between the first full-route network and the second full-route network to reach the first terminal network.

11. The method for delivering content objects over the Internet with the distribution system as recited in claim 9, wherein the second egress point is chosen in at least one of the following ways:
    in round-robin fashion from egress points,
    randomly from egress points, or
    sequentially from egress points.

12. The method for delivering content objects over the Internet with the distribution system as recited in claim 9, wherein:
    the first egress point is in a first geographic location, the second egress point is in a second geographic location, and the first geographic location is different from the second geographic location.

13. A method for delivering content objects over the Internet with a distribution system, the method comprising steps of:
 receiving a first request to deliver a first content object to a first end user, wherein:
  the distribution system comprises a point of presence (POP),
  the POP is coupled to a plurality of full-route networks,
  the plurality of full-route networks comprise a first full-route network and a second full-route network,
  each of the plurality of full-route networks delivering content objects to a plurality of terminal networks,
  the plurality of terminal networks comprise a first terminal network,
  the first terminal network is coupled to a plurality of end users,
  the plurality of end users comprise the first end user, a second end user and a third end user,
  the first end user, the second end user and the third end user subscribe to the first terminal network for Internet service,
  the POP is coupled to the first terminal network, and
  the plurality of full-route networks are coupled to the first terminal network;
 determining that the first end user is associated with the first terminal network;
 delivering the first content object with a first egress point between the POP and the first terminal network;
 receiving a second request to deliver a second content object to the second end user,
 determining that the first egress point reaches a first level of utilization;
 determining that the second end user is associated with the first terminal network;
 determining that a second egress point between the POP and, the first full-route network is more efficient a route than using a second egress point between the POP and the second full-route network;
 delivering the second content object with the second egress point, wherein delivery with the second egress point is triggered by reaching the first level of utilization;
 receiving a third request to deliver a third content object to the third end user,
 determining that the second egress point reaches a second level of utilization determining that the third end user is associated with the first terminal network; and
 delivering the third content object with a third egress point between the POP and the second full-route network, wherein:
  delivery with the third egress point is triggered by reaching the second level of utilization,
  delivering the third content object begins while still delivering the second content object, and
  the third egress point is chosen without considering routing efficiency of starting delivery with the third egress point.

14. The method for delivering content objects over the Internet with the distribution system as recited in claim 13, wherein each of the plurality of full-route networks and the plurality of terminal networks are autonomous systems.

15. The method for delivering content objects over the Internet with the distribution system as recited in claim 13, wherein delivery of content objects after reaching the second level of utilization are randomly distributed among the other full-route networks.

16. The method for delivering content objects over the Internet with the distribution system as recited in claim 13, wherein delivery of content objects after reaching the second level of utilization are distributed among the plurality of full-route networks, excluding the first full-route network, according to a sequential algorithm.

17. The method for delivering content objects over the Internet with the distribution system as recited in claim 13, wherein delivery of content objects after reaching the second level of utilization are distributed among the plurality of full-route networks, excluding the first full-route network, according to a weighted algorithm.

18. The method for delivering content objects over the Internet with the distribution system as recited in claim 17, wherein the weighted algorithm is weighted by at least one of bandwidth cost, latency, packet loss, or maximum bandwidth.

19. The method for delivering content objects over the Internet with the distribution system as recited in claim 13, wherein at least one of the first or second level of utilization is a percentage of a capacity of the first or second egress point.

20. The method for delivering content objects over the Internet with the distribution system as recited in claim 13, wherein the second level of utilization is defined by a packet loss rate for the second egress point.

21. The method for delivering content objects over the Internet with the distribution system as recited in claim 13, wherein:
 the first egress point has lower latency than the second egress point, and
 the second egress point has lower latency than the third egress point.

22. The method for delivering content objects over the Internet with the distribution system as recited in claim 13, wherein:
 the first egress point has lower cost to the distribution system than the second egress point, and
 the second egress point has lower cost to the distribution system than the third egress point.

23. The method for delivering content objects over the Internet with the distribution system as recited in claim 13, wherein the first, second and third content objects are duplicates of each other.

24. The method for delivering content objects over the Internet with the distribution system as recited in claim 13, wherein the content object is a whole file or a whole stream.

* * * * *